April 14, 1931.　　　D. R. PRICE　　　1,801,106
IMPULSE METERING SYSTEM
Filed Dec. 13, 1929
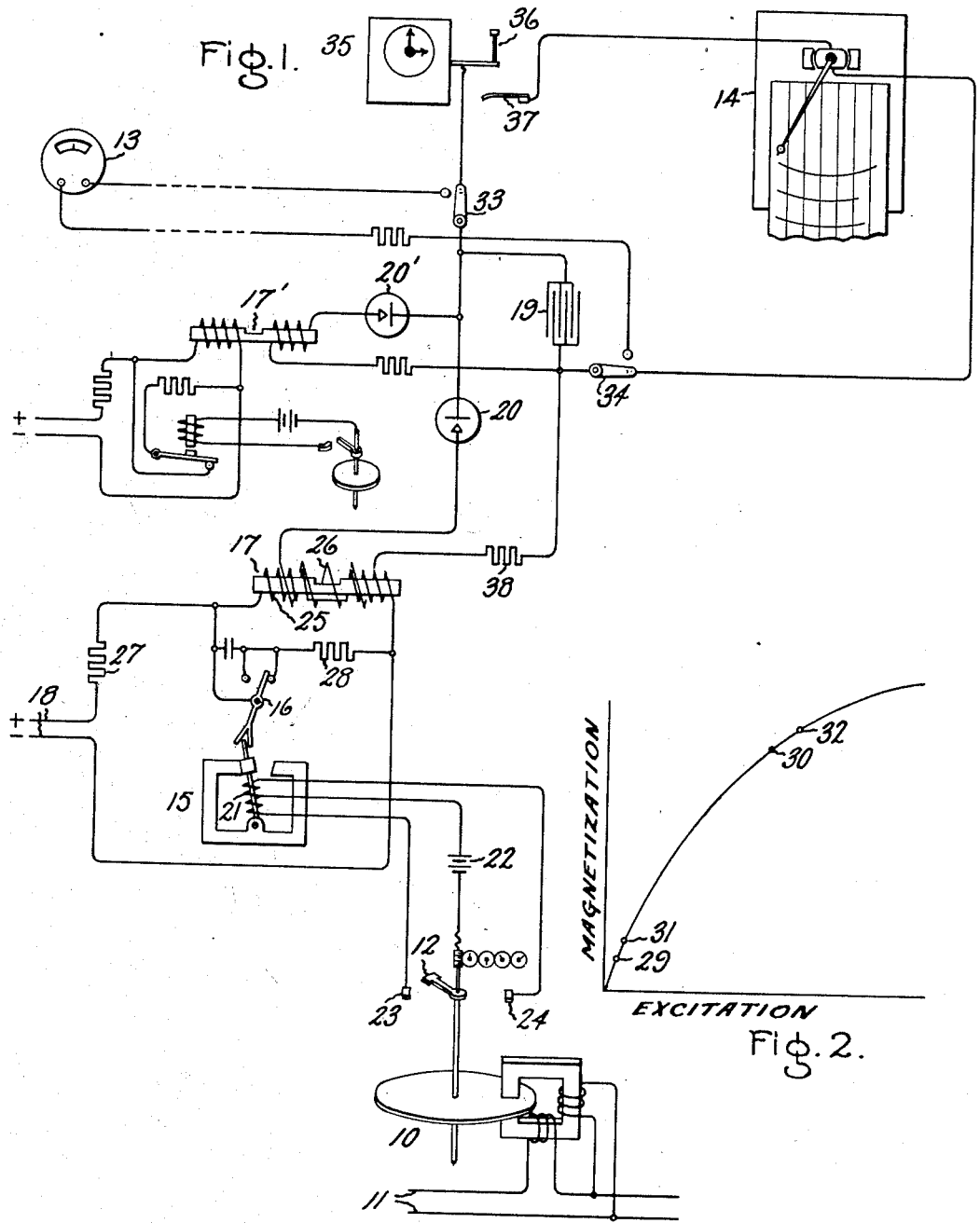
Inventor:
David R. Price,
by Charles W. Muller
His Attorney.

Patented Apr. 14, 1931

1,801,106

UNITED STATES PATENT OFFICE

DAVID R. PRICE, OF SWAMPSCOTT, MASSACHUSETTS, ASSIGNOR TO GENERAL ELECTRIC COMPANY, A CORPORATION OF NEW YORK

IMPULSE METERING SYSTEM

Application filed December 13, 1929. Serial No. 413,913.

My invention relates to metering systems such as telemetering and demand meter systems of the character in which electrical impulses or impulse effects such as may be produced by a contact making integrating meter are transformed into an instrument deflection either continuously or periodically for demand purposes. The main object of my invention is to provide a system of this character in which the transformed measurement shall be independent of wide voltage variations in the source of supply therefor. The invention also includes a novel method of storing up impulse effects over appreciable periods of time and releasing them at definite time intervals to produce a demand measurement.

The features of my invention which are believed to be novel and patentable will be pointed out in the claims appended hereto. For a better understanding of my invention reference is made in the following description to the accompanying drawing in which Fig. 1 represents a wiring diagram and assembly of a complete system for transforming impulses produced by an integrating meter into either a measurement deflection for telemetering purposes or into demand meter deflections over definite periods of time.

Fig. 2 represents a typical saturation curve of the impulse transforming apparatus employed in my invention for making the system independent of voltage variations in the source of supply.

In Fig. 1 I have represented at 10 an integrating wattmeter connected to integrate the flow of power in a circuit 11 and arranged to transmit electrical impulses at a rate proportional to the speed of rotation of the meter by a contact device represented at 12. The purpose of sending out such impulses is in order that they may be transformed into a steady indication of the average flow of power in circuit 11 at a distant point on an indicating instrument at 13 or such that a demand indication or record of the flow of power over definite time intervals may be obtained at an instrument 14 and in general to transfer the measurement to a different point or to transform it into a different form or for both purposes.

In order that the electrical receiving instruments shall accurately reproduce the measurements intended it is essential that such measurements shall be proportional to the impulse rate and independent of any change in voltage of the source from which they are supplied.

The main purpose of the apparatus interposed between the transmitting and receiving devices is to render the receiving instruments independent of voltage variations in the source of supply. The interposed apparatus for the particular embodiment of the invention represented is comprised essentially of impulse means such as a relay 15 energized through the meter contact device 12 and a switch 16 operated by the relay, a transformer 17 energized from a direct current source 18 and controlled through the action of the switch 16, and a condenser 19 supplied from the transformer through a valve 20.

The particular form of relay 15 is not important but I have illustrated a polarized relay having an energizing coil 21 with a mid-tap connected through a direct current source 22 to the movable contact 12 of the meter 10. The outer ends of the coil are connected to stationary contacts 23 and 24 respectively with which the rotating contact 12 engages when on opposite diameters of its circular path of travel. By this arrangement the polarized relay is oppositely energized to cause its movable armature to move to the two positions of its travel during each revolution of the contact arm 12. The polarized relay by its operation moves the two way switch 16 back and forth between its two contacting positions. If the meter 10 had sufficient torque it might be used to operate the switch 16 directly and such an arrangement is intended to be included within the scope of my invention.

The transformer 17 is provided with two coils 25 and 26. The coil 25 which we may designate the primary coil is connected to the source of direct current supply 18 through a resistance 27. The purpose of the two-way switch 16 is to short-circuit transformer winding 25 through a resistance 28 in either of the contacting positions. A spark absorbing condenser is preferably connected across the contacts of switch 16. The action of switch 16 causes high voltage impulses to be induced in the secondary winding 26, which impulses are rectified at 20 and go to charge the condenser 19. The particular form of rectifier or valve at 20 is immaterial so long as it will pass the impulses in one direction and prevent the discharge of the condenser in the opposite direction. A copper oxide rectifier has been found satisfactory for this purpose. A time delay relay might also be used. Such impulses are of constant magnitude regardless of variations in the source of supply 18 by reason of the proper adjustment and arrangement of the transforming apparatus as will now be explained.

The switch 16 in either of its contacting positions shunts the low tension primary winding 25 through resistance 28. This causes a large percentage of the current to be shunted resulting in a gradual rise in voltage across the secondary winding 26, which voltage is in such a direction or of such magnitude, or both, that it does not cause any current to flow through the valve 20 to the condenser. When, however, the switch 16 opens the short-circuit through the resistance 28 the current in winding 25 rises quickly due to the nature of the circuit. A high voltage is induced in winding 26 which goes through the valve and is stored in the condenser 19 which is preferably an electrolytic condenser of considerable capacity. The reason why these impulses are definite in amount regardless of voltage variations at 18 may be explained by reference to Fig. 2 which shows the saturation curve of the transformer when producing such impulses. If the voltage at 18 is 110 volts the magnetism of the transformer will start at point 29 with the coil 25 shunted and will go to 30 with the short circuit through resistance 28 open. If the voltage at 18 is 150 volts, the magnetism will start at 31 and go to 32. The value of resistance at 28 is made by trial and adjusted until the rise from 29 to 30 is equal to the rise from 31 to 32. A resistance or reactance 38 may also be included in the circuit leading to the condenser to assist in adjusting for the desired action. If the source at 18 is a storage battery 38 may be a resistance. If the source is a generator a reactance should be used at 38 to eliminate the effect of commutation ripples. Such adjustments are made for the maximum voltage variations of the source as are liable to be met with in practice and when made the quantity of electricity fed to the condenser per impulse will remain constant regardless of such voltage variations. To obtain the best results I have found that the transformer should have a laminated iron core containing an air gap. A straight iron core containing a reduced portion at the center as represented, has been found to give the desired slope to the saturation curve represented in Fig. 2.

Having obtained an impulse device which is independent of voltage variation we may employ the impulses for any desired purpose. Two examples of these uses are represented. Switches 33 and 34 may be used to connect the condenser to an indicating instrument 13 or to a demand meter 14. The latter connection is represented by the position of the switches. 35 represents a contact making clock or timing device adapted to close the demand meter circuit through contacts 36 and 37 at suitable time intervals such for example as every fifteen minutes. During the fifteen minute interval when the demand meter circuit is open the impulses will be stored in the condenser 19 and a charge will accumulate which is proportional to the number of such impulses during the interval or proportional to the demand over the interval. At the end thereof the movable clock contact 36 contacts with 37 and the condenser charge flows through the coil of the electrical demand instrument 14 causing such instrument to deflect accordingly. The instrument is represented as a recording demand meter and records such as are represented are produced on the moving chart thereof at the end of each demand interval corresponding to the demand as measured over the interval. The storing of impulses in a condenser over a demand interval and releasing them through a measuring instrument at the end thereof to obtain a demand measurement is believed to be new and constitutes a portion of the present invention.

If now we move the switches 33 and 34 to connect the condenser to the indicating instrument 13 the current accumulates in the condenser until the voltage rises sufficiently to drain off through the instrument circuit and we obtain a steady indication proportional to the average charge on the condenser or to the average impulse rate or proportional to the speed of meter 10. Such use is particularly suitable for telemetering purposes.

It will be evident to those skilled in the art that the impulse system disclosed is suitable for general metering applications and that by connecting additional impulse systems to the condenser 19 as indicated at 17', 20' I may obtain summation telemetering and demand indications or records.

In accordance with the provisions of the patent statutes I have described the principle of operation of my invention, together with the apparatus which I now consider to represent the best embodiment thereof; but I desire to have it understood that the apparatus shown and described is only illustrative and that the invention may be carried out by other means.

What I claim as new and desire to secure by Letters Patent of the United States, is:

1. In an impulse metering system, means for producing constant quantities of electricity in response to impulses, comprising a transformer having a primary winding connected to a direct current source, impulse means for varying the current which is allowed to flow through said transformer winding, a secondary winding for said transformer in which currents are induced by the action of said impulse means, the design of said transformer being such as to induce equal current impulses in the secondary regardless of considerable variation in the voltage of said source of supply.

2. In an impulse metering system, means for producing constant quantities of electricity in response to impulses, comprising a transformer having a magnetic core provided with an air gap, a primary winding for said transformer energized from a direct current source, impulse means for decreasing and increasing the primary current of said transformer, a secondary winding for said transformer in which currents are induced by the action of said impulse means, the transformer having a saturation curve which gives equal current impulses in its secondary winding for considerable variation in the voltage of the direct current source.

3. In an impulse metering system, a transformer having a primary winding energized from a direct current source, a resistance circuit shunting said transformer winding, a switch in said shunt circuit operated in response to an impulse rate for varying the current flowing in said transformer winding, a secondary winding for said transformer in which current impulses are induced in response to the action of said switch, the saturation characteristics of said transformer and the variation in current of the primary winding being such that equal current impulses are induced into the secondary winding of the transformer for considerable variation in the voltage of the direct current source.

4. In an impulse metering system an integrating meter, switching means actuated in response to the rate of rotation of said meter for transmitting electric current impulses, a source of supply for such electric impulses, an electro-responsive device energized by the impulse current, and means interposed between the electro-responsive device and switching means for automatically maintaining the quantity of electricity transmitted per impulse independent of variations in the voltage of said source of supply.

5. In an impulse metering system, an integrating meter, a switching device actuated in accordance with the speed of rotation of the meter for creating electric current impulses, a transformer through which such impulses are transmitted, an electric measuring instrument influenced by the impulse current transmitted through said transformer, said transformer serving to transmit impulses of equal magnitude regardless of variations in the voltage of the source of supply.

6. In an impulse metering system, means for transmitting electric current impulses at a rate responsive to a measurement rate, a transformer through which the impulses are transmitted, a condenser supplied by the impulse current from said transformer, and means interposed between the transformer and condenser for allowing only current impulses of one polarity to pass to said condenser.

7. An impulse metering system comprising a transformer having primary and secondary windings, a direct current source of supply for the primary winding of said transformer, switching means actuated at a rate proportional to a measurement rate for creating impulses in the direct current supplied to said primary winding, a condenser supplied by the secondary winding of said transformer, means interposed between the transformer and condenser for permitting current impulses to flow only in one direction between said transformer and condenser, the transformer serving to make the current impulses flowing between it and the condenser of equal magnitude regardless of variations in voltage of the direct current source of supply, and an electric measuring instrument supplied from said condenser.

8. In an impulse metering system, a condenser, means for charging said condenser by unidirectional electric current impulses of equal magnitude at a rate proportional to a measurement rate, an electric measuring instrument, and time controlled means for periodically releasing the charge on said condenser through said instrument.

9. In an impulse metering system, a direct current source of supply, a condenser, a transformer supplied by said source and supplying said condenser, means for creating impulses in the direct current supplied to said condenser at a rate proportional to a measurement, means interposed between said transformer and condenser for passing current impulses in only one direction, said transformer serving to make such impulses of equal magnitude regardless of variations in the source of supply, an electric measuring instrument, and time controlled means for periodically discharging said condenser through said electric measuring instrument.

10. In an impulse metering system, a rotating device, means responsive to the rate of rotation of said device for creating electric current impulses at a corresponding rate, a condenser for collectively storing a plurality of such impulses over equal time intervals, an electric measuring instrument, and means for discharging said condenser through said electric measuring instrument at the end of such time intervals.

11. In an impulse metering system wherein current impulses are produced at a rate proportional to the rate of rotation of an integrating meter, the method of demand measurement which consists in collectively storing the electricity of a plurality of such impulses over a predetermined period of time and then measuring the quantity of electricity thus stored.

12. In an impulse measuring system, a plurality of integrating meters, means responsive to the respective rates of rotations of said meters for producing electric current impulses at corresponding rates, a condenser charged by such impulses, means interposed between the condenser and impulse producing means for causing said impulses to be of equal magnitude, and an electric measuring instrument for measuring the charge on said condenser.

In witness whereof, I have hereto set my hand this 10th day of December, 1929.

DAVID R. PRICE.